(12) United States Patent  
Katsuyama et al.

(10) Patent No.: US 7,036,997 B2
(45) Date of Patent: May 2, 2006

(54) OPTICAL MODULE

(75) Inventors: Yutaka Katsuyama, Osaka (JP); Makoto Shiraishi, Aichi (JP); Kentaro Hayashi, Aichi (JP)

(73) Assignee: J.S.T. Mfg. Co., Ltd., (JP)

( * ) Notice: Subject to any disclaimer, the term of this patent is extended or adjusted under 35 U.S.C. 154(b) by 0 days.

(21) Appl. No.: 10/981,258

(22) Filed: Nov. 4, 2004

(65) Prior Publication Data

US 2005/0105844 A1   May 19, 2005

(30) Foreign Application Priority Data

Nov. 13, 2003   (JP) ............... 2003-383631

(51) Int. Cl.
*G02B 6/36* (2006.01)
*G02B 6/38* (2006.01)

(52) U.S. Cl. .............. 385/73; 385/24; 385/27; 385/31; 385/39; 385/52; 385/71; 385/72; 385/75; 385/81; 385/83

(58) Field of Classification Search ............ 385/24, 385/27, 31, 39, 52, 71, 72, 75, 73, 81, 83
See application file for complete search history.

(56) References Cited

U.S. PATENT DOCUMENTS

2003/0179993 A1 *  9/2003  Shigenaga et al. ........... 385/33

* cited by examiner

*Primary Examiner*—Frank G. Font
*Assistant Examiner*—Michael P Mooney
(74) *Attorney, Agent, or Firm*—Osha Liang LLP (57) ABSTRACT

An optical module comprises an first filter, an optical fiber for guiding light wave to a first end face of the filter, a second optical fiber for guiding a light wave transmitted through the filter from a second end face of the filter, a third optical fiber for guiding light wave to said second end face of the filter, a fourth optical fiber for guiding the light wave reflected by the filter and the light wave transmitted through the filter from said first end face of the filter, a plug connector for positioning said first and fourth optical fibers, and a socket connector for positioning said second and third optical fibers.

10 Claims, 6 Drawing Sheets

OPTICAL MODULE

BACKGROUND OF THE INVENTION

1. Field of the Invention

The present invention relates to a module employed in systems using wavelength division multiplex.

2. Description of Related Art

Wavelength division multiplex (WDM) has been extensively developed as an optical transmission technique which is expected to be applied to the backbone line for next generation Internet. This WDM technique makes it possible to bi-directionally transmit a large amount of data by making use of light waves with different wavelengths to be transmitted through a single optical fiber in order to multiplex a plurality of channels.

In the case of the optical network based on the WDM technique, an optical add drop multiplexer (OADM) optical module is used to extract or interpose a light wave having a particular wavelength from a plurality of light waves which have different wavelengths and propagate through a single optical fiber. An OADM optical module is proposed as a technique for extracting or interposing a light wave having a particular wavelength from a plurality of light waves which have different wavelengths by combining optical wave guide paths and a wavelength selective filter (refer to Japanese Patent Published Application No. Hei 11-109149).

The optical wave guide paths for use in the technique as described above are fabricated by laminating an inorganic material such as quartz, a plastic and the like on a substrate by the silicon wafer technique or CVD (Chemical Vapor Deposition). However, these techniques require an expensive manufacturing facility and many manufacturing steps. Particularly, the manufacture cost tends to increase by the requirement of high-precision processing for reducing the gap between the filter and the light path. Furthermore, since the optical wave guide paths are formed on the substrate, there is a problem that the geometry is generally restricted by the profile of the substrate.

SUMMARY OF THE INVENTION

It is a main object of the present invention to provide an optical module which can be manufactured at a low cost with increased flexibility in shape.

In accordance with the first aspect of the present invention, the optical module of the present invention comprises: a filter configured to transmit only a light wave having a particular wavelength and reflect a light wave having other wavelengths; a first optical fiber configured to guide a first light wave to a first end face of said filter; a second optical fiber configured to guide the first light wave transmitted through said filter from a second end face of said filter opposite said first end face, if the first light wave has the particular wavelength; a third optical fiber configured to guide a second light wave having the particular wavelength to said second end face: a fourth optical fiber configured to guide, from said first end face, the first light wave not having the particular wavelength that is reflected by said filter and the second light wave transmitted through said filter: a first base configured to position said first and fourth optical fibers; and a second base configured to position said second and third optical fibers, wherein said filter can be supported between the end faces of said first and the second bases in order that the end faces of said first and fourth optical fibers come in contact with said first end face and that the end faces of said second and third optical fibers come in contact with said second end face.

In accordance with the present invention, light paths can be formed by the use of the cheaper first to fourth optical fibers, and therefore it is possible to reduce the manufacturing cost as compared to the case by the use of optical wave guide paths. Furthermore, the first to fourth optical fibers can be brought in contact with the filter by supporting the filter between the end faces of the first and second bases at which the ends of the first to fourth optical fibers are positioned, and therefore it is possible to further reduce the manufacturing cost of the optical module. Still further, the first and second bases can be manufactured in separate processes, and therefore the flexibility in shape of the optical module can be increased.

BRIEF DESCRIPTION OF THE DRAWINGS

Other and further objects, features and advantages of the invention will appear more fully from the following description taken in connection with the accompanying drawings in which:

FIG. 2(*a*) is a cross sectional views showing the optical module taken along the line II—II of FIG. 1 in advance of completing the assembling process.

FIG. 2(*b*) is a cross sectional views showing the optical module taken along the line II—II of FIG. 1 after completing the assembling process.

DESCRIPTION OF THE PREFERRED EMBODIMENTS

Figure 1:
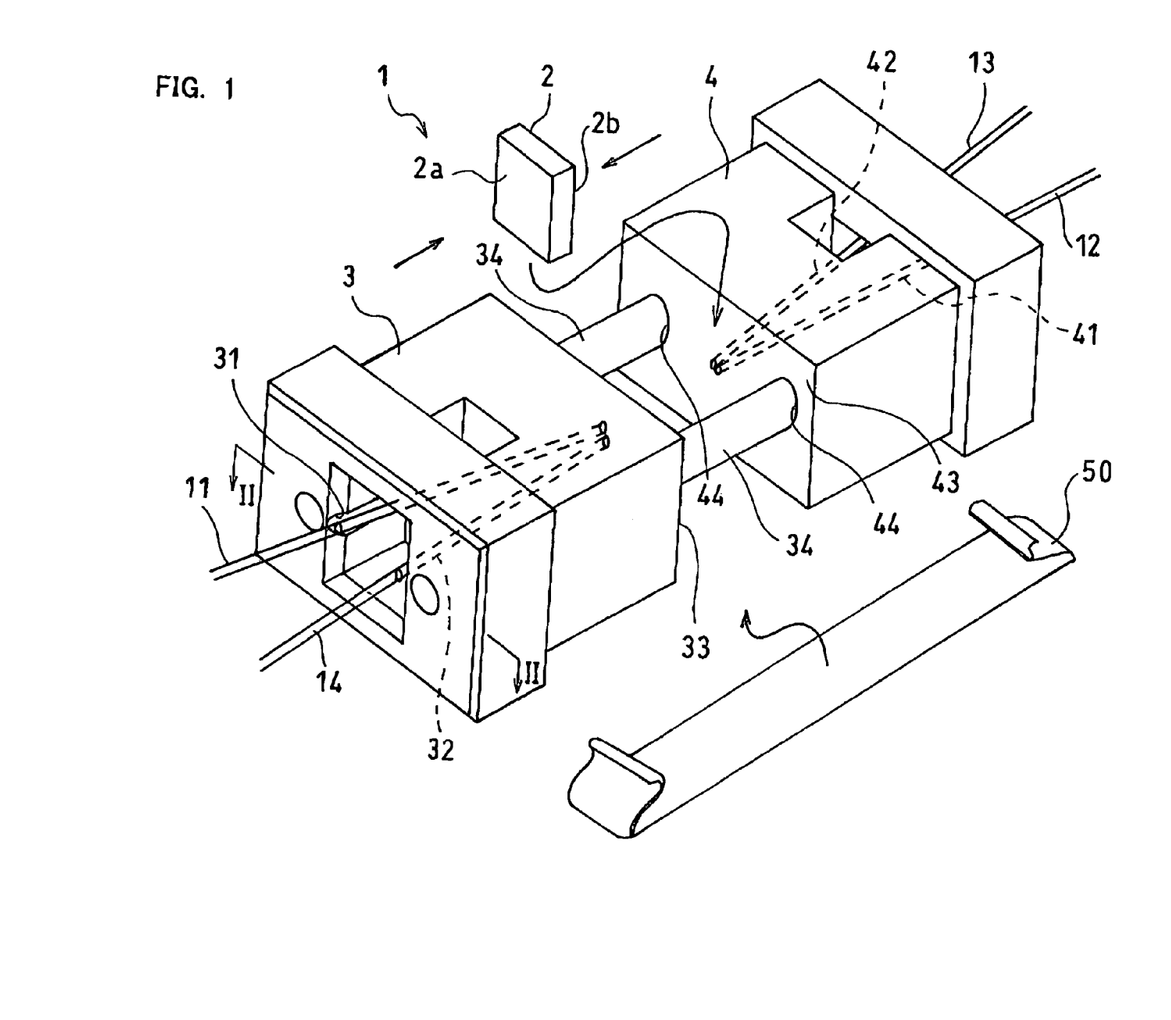
FIG. 1 is an exploded perspective view of the optical module in accordance with the first embodiment of the present invention.

In what follows, the structure of an optical module in accordance with the present invention will be explained with reference to FIG. 1. FIG. 1 is an exploded perspective view of the optical module 1. The optical module 1 is an OADM optical module for use in a node of an optical network and serves to drop or add a light wave having a particular wavelength, which is assigned to that node, from or to a plurality of light waves which have different wavelengths and propagate through a single optical fiber. As shown in FIG. 1, the optical module 1 comprises a wavelength selective filter 2, a network input optical fiber (first optical fiber) 11, a node output optical fiber (second optical fiber) 12, a node input optical fiber (third optical fiber) 13, a network output optical fiber (the fourth optical fiber) 14, a plug connector (first base) 3, a socket connector (second base) 4 and a lock spring (locking mechanism) 50.

When supported between the plug connector 3 and the socket connector 4 (as indicated by arrow in the figure), the wavelength selective filter 2 serves to transmit only a light wave having the particular wavelength and reflect other light waves and comprises dielectric multilayer filter which are formed by stacking a plurality of the dielectric films on a substrate. It is possible to adjust the particular wavelength transmitted through the wavelength selection filter 2 by appropriately selecting the dielectric films. Incidentally, any appropriately type other than dielectric multilayer filters can be used as the wavelength selection filter 2.

The network input optical fiber 11 is connected with a backbone optical fiber of an optical network, which is not shown in the figure, and serves to guide a plurality of light waves, which have different wavelengths and are input from the optical network, to the filter end face 2*a* of the wavelength selection filter 2. The node output optical fiber 12 is connected to a node, not shown in the figure, and guides a light wave having a particular wavelength which is guided by the network input optical fiber 11 and transmitted through the wavelength selection filter 2 such that the light wave from the filter end face 2*b* is output to the node.

The node input optical fiber 13 is connected to a node, not shown in the figure, and guides a light wave having the particular wavelength from the node to the filter end face 2*b* of the wavelength selection filter 2. The network output optical fiber 14 is connected with a backbone optical fiber of the optical network, which is not shown in the figure, and output the light wave having wavelengths other than the particular wavelength, which are guided by the network input optical fiber 11 and reflected by the wavelength selection filter 2 and the light wave having the particular wavelength, which are guided by the node input optical fiber 13 and transmitted through the wavelength selection filter 2 to the optical network through the filter end face 2*a*. Incidentally, each optical fiber as described above is composed of a core located in the center and a cladding and shaped to have a circular cross section. Also, while these optical fiber are a single-mode fiber, a multimode fiber can also be used.

The plug connector 3 is connected to the socket connector 4, and provides light paths by fixedly positioning the network input optical fiber 11 and the network output optical fiber 14, and the plug connector 3 comprises a contour the same as the ferrule of an MT connector made of PPS (polyphenylene-sulfide) and LCP (Liquid Crystal Polymer). Also, the plug connector 3 is provided with fiber insertion holes 31 and 32, a contact surface (end face) 33 and plugs 34.

The fiber insertion holes 31 and 32 are cylindrical holes into which the network input optical fiber 11 and the network output optical fiber 14 are fixedly inserted with an adhesive, Also, the fiber insertion holes 31 and 32 are formed along a straight line from the end face opposite the contact surface 33 of the plug connector 3 through the contact surface 33 at which are positioned the ends of the network input optical fiber 11 and the network output optical fiber 14 which are inserted into the fiber insertion holes 31 and 32. Furthermore, the distance between the fiber insertion holes 31 and 32 at the end faces thereof opposite the contact surface 33 is larger than the distance between the fiber insertion holes 31 and 32 at the contact surface 33.

The contact surface 33 is an end face which comes in contact with the end face of the wavelength selection filter 2, when the optical module 1 is assembled, while the respective ends of the network input optical fiber 11 and the network output optical fiber 14 inserted through the fiber insertion holes 31 and 32 are located at the contact surface 33. Also, the contact surface 33 is surface polished in order to form rounded convex surfaces at whose leading edge position the ends of the network input optical fiber 11 and network output optical fiber 14 are located respectively. In this configuration, the ends of the network input optical fiber 11 and the network output optical fiber 14 can be brought in contact with the filter end face 2*a* only by pressing the contact surface 33 against the filter end face 2*a* of the filter 2. Furthermore, since the ends of the network input optical fiber 11 and the network output optical fiber 14 are polished, it is possible to eliminate flaws and the like. Therefore, optical losses can be reduced.

The plugs 34 are planted in the vicinity of both ends of the contact surface 33 in the longitudinal direction thereof, one for either end, and guided by guides 44, to be described below, of the socket connector 4 so as to position the plug connector 3 and the socket connector 4 with higher accuracy, and cylindrically shaped to project in the direction normal to the contact surface 33.

The socket connector 4 is connected to the plug connector 3, and provides light paths by fixedly positioning the node output optical fiber 12 and the node input optical fiber 13, and the plug connector 3 comprises a contour the same as the ferrule of an MT connector made of PPS and LCP. Also, the socket connector 4 is provided with fiber insertion holes 41 and 42, a contact surface (end face) 43 and guide holes 44.

The fiber insertion holes 41 and 42 are cylindrical holes into which the node output optical fiber 12 and the node input optical fiber 13 are fixedly inserted with an adhesive. Also, the fiber insertion holes 41 and 42 are formed along a straight line from the end face opposite the contact surface 43 of the socket connector 4 through the contact surface 43 at which are positioned the ends of the node output optical fiber 12 and the node input optical fiber 13 which are inserted into the fiber insertion holes 41 and 42. Furthermore, the distance between the fiber insertion holes 41 and 42 at the end faces thereof opposite the contact surface 43 is larger than the distance between the fiber insertion holes 41 and 42 at the contact surface 43.

The contact surface 43 is an end face which comes in contact with the end face of the wavelength selection filter 2, when the optical module 1 is assembled, while the respective ends of the node output optical fiber 12 and the node input optical fiber 13 are located at the contact surface 43. Also, the contact surface 43 is surface polished in order to form rounded convex surfaces at whose leading edge position the ends of the node output optical fiber 12 and the node input optical fiber 13 are located respectively. In this configuration, the ends of the node output optical fiber 12 and the node input optical fiber 13 can be brought in contact with the filter end face 2*b* only by pressing the contact surface 43 against the filter end face 2*b* of the filter 2. Furthermore, since the ends of the node output optical fiber 12 and the node input optical fiber 13 are polished, it is possible to eliminate flaws and the like. Therefore, optical losses can be reduced.

The guide holes 44 are provided for guiding the plugs 34 of the plug connector 3 in order to position the plug connector 3 and the socket connector 4 with higher accuracy, and cylindrically shaped to extend in one direction. Also, the guide holes 44 are formed in the vicinity of both ends of the contact surface 43 in the longitudinal direction thereof, one for either end, in order to extend in the direction normal to the contact surface 43.

The lock spring 50 serves to maintain the engagement between the plug connector 3 and the socket connector 4 and is made of a resilient member which is formed by crimping both ends of a single metal plate extending in one direction to form S-shaped curves.

Figure 2:
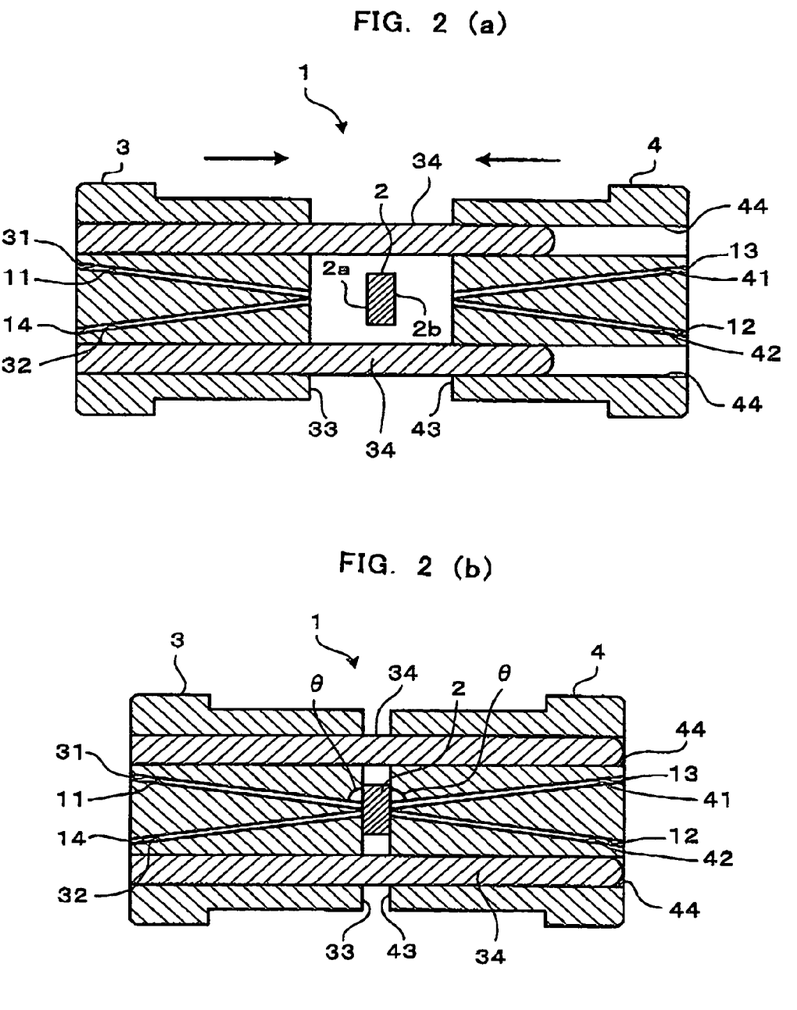

Next, the assembling process of the optical module 1 will be explained with reference to FIG. 2 and FIG. 3. FIG. 2 illustrates the assembling process of the optical module 1.

Meanwhile, FIG. 2(a) is a cross sectional view taken along the line II—II of FIG. 1 showing the optical module 1 in advance of completing the assembling process. FIG. 2(b) is a cross sectional view taken along the line II—II of FIG. 1 showing the optical module 1 after completing the assembling process. Arrows in the figure indicate the moving direction of the plug connector 3 and socket connector 4. FIG. 3 is a side view showing the latching condition of the lock spring 50.

As shown in FIG. 2(a), when assembling the optical module 1, the plug connector 3 and the socket connector 4 are arranged in order that the contact surface 33 of the plug connector 3 and the contact surface 43 of the socket connector 4 face each other. Also, the wavelength selection filter 2 is arranged in order that the filter end face 2a faces the contact surface 33 and that the filter end face 2b faces the contact surface 43. Then, the plug connector 3 and the socket connector 4 are moved to each other to insert the ends of the plugs 34 of the plug connector 3 into the guide holes 44 of the socket connector 4.

The plugs 34 are deeply inserted into the guide holes 44 by further moving the plug connector 3 and the socket connector 4 close to each other so that the wavelength selection filter 2 is supported between the contact surface 33 and the contact surface 43 as shown in FIG. 2(b). By doing this, the assembling process of the optical module 1 is completed. At this time, while the filter end face 2a comes in contact with the network input optical fiber 11 and network output optical fiber 14 which are located at the contact surface 33, the filter end face 2b comes in contact with the node output optical fiber 12 and node input optical fiber 13 which are located at the contact surface 43. In this case, while the network input optical fiber 11 and the node input optical fiber 13 come in contact respectively with the filter end faces 2a and 2b at an angle θ of no greater than 90 degrees, the straight line connecting the network input optical fiber 11 and the node output optical fiber 12 intersects with the straight line connecting the node input optical fiber 13 and the network output optical fiber 14 at a point inside of the wavelength selection filter 2.

Figure 3:
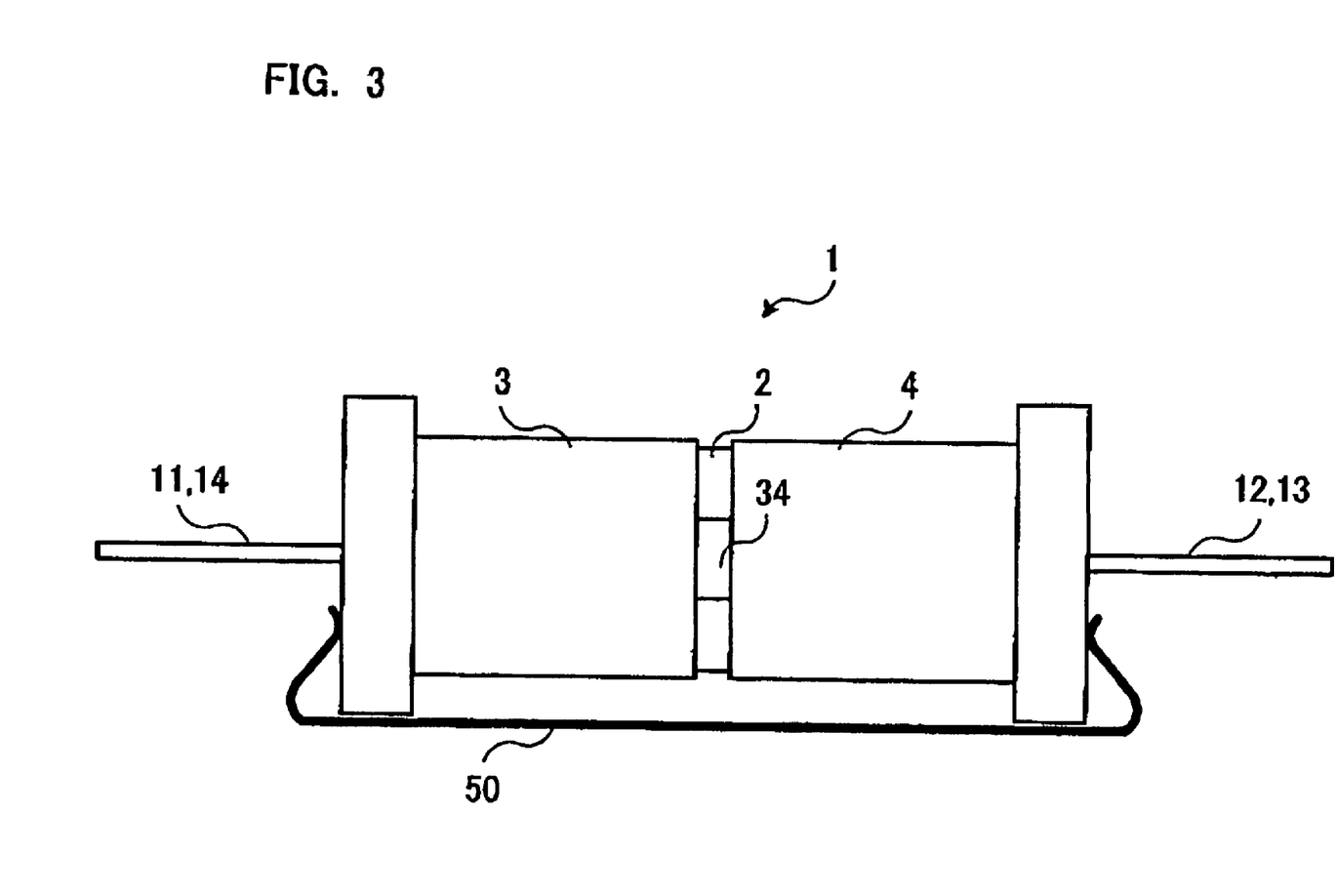
FIG. 3 is a side view showing the latching condition of a lock spring.

As shown in FIG. 3, after connecting the socket connector 4 and the plug connector 3, the inward ends of the S-shaped curves of the lock spring 50 at its both ends are engaged with the end faces of the plug connector 3 and socket connector 4 respectively opposite the contact surfaces 33 and 43. The inward ends of the S-shaped curves at the both ends push the end faces opposite the respective contact surfaces 33 and 43 in the engagement direction by the elastic force of the lock spring 50 in order to maintain the engagement between the plug connector 3 and the socket connector 4. As has been discussed above, in the case of the optical module 1, it is easy to engage and disengage the plug connector 3 and the socket connector 4 so that the wavelength selection filter 2 supported between the respective contact surfaces 33 and 43 is replaceable.

Figure 4:
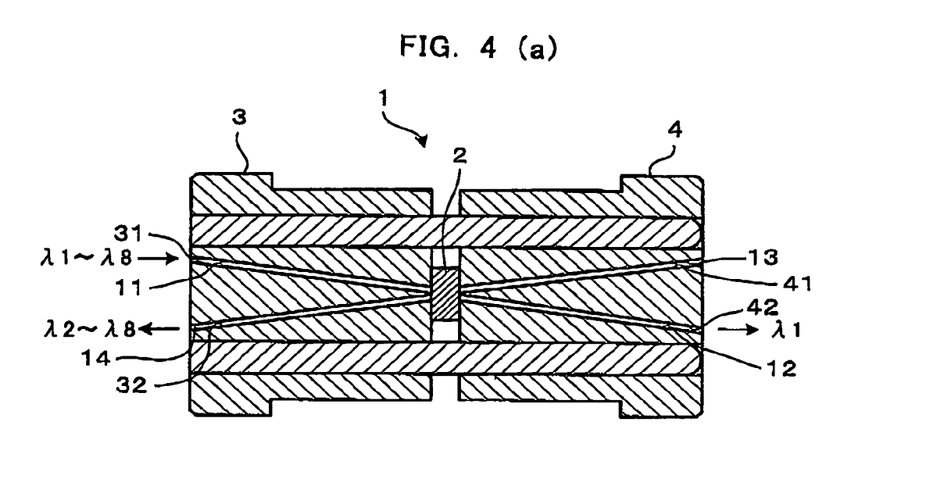
FIG. 4 is a view for explaining the operation of the optical module shown in FIG. 1.

Next, the operation of the optical module 1 after completing the assembling process of the optical module 1 will be explained with reference to FIG. 4. FIG. 4 is a view for explaining the operation of the optical module 1. Meanwhile, FIG. 4(a) is used to explain the dropping operation of extracting a light wave having a particular wavelength $\lambda_1$ while FIG. 4(b) is used to explain the adding operation of adding a light wave having the particular wavelength $\lambda_1$. In this example for explanation, while light waves having eight wavelengths $\lambda_1$ to $\lambda_8$ are used, the dielectric film with which the wavelength selection filter 2 is formed is designed to transmit the light wave having the wavelength $\lambda_1$ and reflect the light waves having the wavelengths $\lambda_2$ to $\lambda_8$.

As shown in FIG. 4(a), in the dropping operation of the optical module 1, light waves having the wavelengths $\lambda_1$ to $\lambda_8$ are input to the network input optical fiber 11 from the network. The light waves having the wavelengths $\lambda_1$ to $\lambda_8$ propagate through the network input optical fiber 11 and reach the filter end face 2a which is in contact with the end of the network input optical fiber 11. Of the light waves having the wavelengths $\lambda_1$ to $\lambda_8$ reaching the filter end face 2a, only the light wave having the wavelength $\lambda_1$ is transmitted through the wavelength selection filter 2, while the light waves having the wavelengths $\lambda_2$ to $\lambda_8$ is reflected by the wavelength selection filter 2. In other words, the wavelength selection filter 2 serves to drop the light wave having the wavelength $\lambda_1$. The light wave having the wavelength $\lambda_1$ as dropped is input to the node output optical fiber 12 through the end thereof being in contact with the filter end face 2b, propagates through the node output optical fiber 12 and is output to the node.

The light waves having the wavelengths $\lambda_2$ to $\lambda_8$ as reflected by the wavelength selection filter 2 are input from the end of the network output optical fiber 14 in contact with the filter end face 2a, propagates through the network output optical fiber 14 and is output to the network.

As shown in FIG. 4(b), in the adding operation of the optical module 1, a light wave having the wavelength $\lambda_1$ is input to the node input optical fiber 13 from the node. The light wave having the wavelength $\lambda_1$ propagates through the node input optical fiber 13 and reaches the filter end face 2b which is in contact with the end of the node input optical fiber 13. The light wave having the wavelength $\lambda_1$ reaching the filter end face 2b is transmitted through the wavelength selection filter 2. Then, the light wave having the wavelength $\lambda_1$ as transmitted through the wavelength selection filter 2 is added in the network output optical fiber 14, at the filter end face 2a, to the light waves having the wavelengths $\lambda_2$ to $\lambda_8$ transmitted through the network input optical fiber 11 and reflected by the wavelength selection filter 2. The light waves having the wavelengths $\lambda_1$ to $\lambda_8$ after the adding operation in the network output optical fiber 14 propagate through the network output optical fiber 14 and is output to the network.

Incidentally, it is possible to design the optical module 1 corresponding to a different wavelength by appropriately selecting the dielectric film with which the wavelength selection filter 2 is formed in order to transmit light waves having the different wavelength and reflect light waves having other wavelengths.

In accordance with the first embodiment as described above, the filter 2 can surely be brought in contact with the respective optical fibers 11 to 14 by making use of the cheaper optical fibers 11 to 14, forming the light paths in the plug connector 3 and the socket connector 4, and supporting the filter 2 between the contact surfaces 33 and 43 where the ends of the respective optical fibers 11 to 14 are located, and therefore it is possible to reduce the cost of manufacturing the optical module 1 as compared to the case making use of optical wave guide paths. Also, the respective optical fibers 11 to 14, the plug connector 3 and the socket connector 4 can be manufactured in separate processes, and therefore the flexibility in shape of the optical module 1 can be increased.

Furthermore, since the respective optical fibers 11 and 13 come in contact with the filter end faces 2a and 2b at an angle θ of no greater than 90 degrees, the straight line connecting the respective optical fibers 11 and 12 intersects with the respective optical fibers 13 and 14 at a point inside of the wavelength selection filter 2, it is possible to effectively separate the backbone fibers of the network and the fibers of the node from each other and prevent light waves from the wavelength selection filter 2 from entering the respective optical fibers 11 and 13.

Still further, the end faces of the optical fibers 11 to 14 can be surely be brought in contact with the filter end faces 2a and 2b by an easy work of surface polishing the contact surfaces 33 and 43 to form rounded convex surfaces.

Also, the wavelength of light wave to be added or dropped can be changed by an easy work of replacing the wavelength selection filter 2.

Furthermore, the optical module 1 can be installed and displaced with ease by separating the plug connector 3 and the socket connector 4.

In addition, the ends of the respective optical fibers 11 to 14 can be accurately brought in contact with the wavelength selection filter 2 by the guide hole 44 of the socket connector 4 guiding the plug 34 of the plug connector 3.

Also, since the plug connector 3 and the socket connector 4 are made of a resin, they can be formed with a die-casting mold at a low cost, and the flexibility in shape can be increased.

Figure 5:
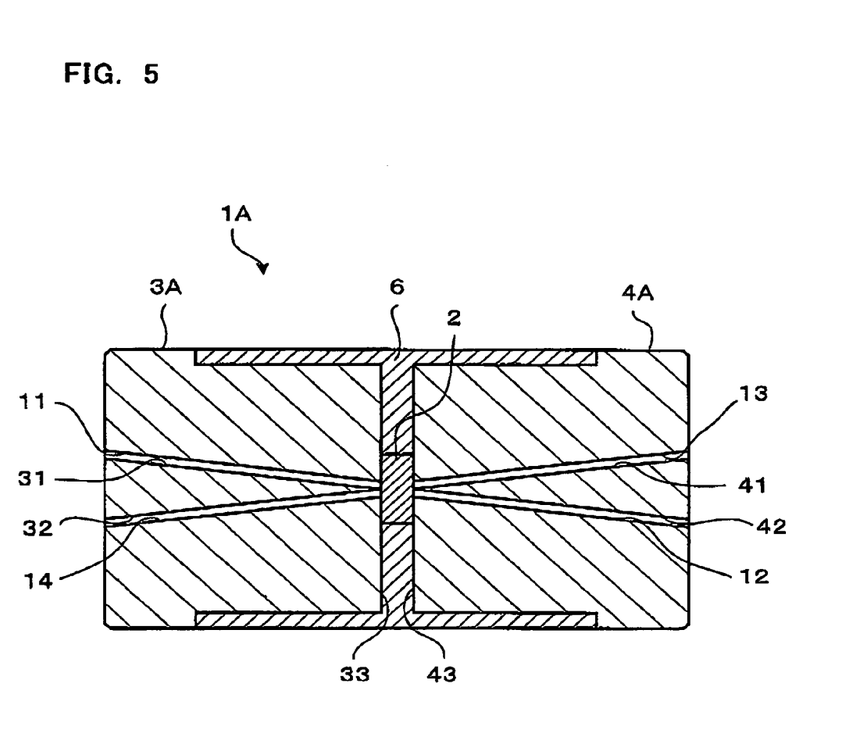
FIG. 5 is a cross sectional view showing an optical module in accordance with the second embodiment of the present invention.

In what follows, the second embodiment in accordance with the present invention will be explained with reference to FIG. 5. FIG. 5 is a cross sectional view showing an optical module in accordance with the second embodiment. The optical module 1A in accordance with the second embodiment is an OADM optical module, like the optical module 1 in accordance with the first embodiment, comprising a wavelength selective filter 2, a network input optical fiber 11, a node output optical fiber 12, a node input optical fiber 13, a network output optical fiber 14, a plug connector 3A and a socket connector 4A. The wavelength selection filter 2 and the respective optical fibers 11 to 14 are substantially same as those of the first embodiment, and therefore no redundant explanation thereof will be repeated.

The plug connector 3A serves to provide light paths by fixedly positioning the network input optical fiber 11 and the network output optical fiber 14 with a ferrule made of PPS or LCP. Also, the plug connector 3A is provided with fiber insertion holes 31 and 32 and a contact surface (end face) 33. The fiber insertion holes 31 and 32 and the contact surface 33 are substantially the same as those of the first embodiment, and therefore no redundant explanation thereof will be repeated.

The socket connector 4A serves to provide light paths by fixedly positioning the node output optical fiber 12 and the node input optical fiber 13 with the ferrule made of PPS or LCP. Also, the socket connector 4A is provided with fiber insertion holes 41 and 42 and a contact surface 43. The fiber insertion holes 41 and 42 and the contact surface 43 are substantially the same as those of the first embodiment, and therefore no redundant explanation thereof will be repeated.

On the other hand, in the case of the optical module 1A, the wavelength selection filter 2, the plug connector 3A and the socket connector 4A are arranged in order to integrally support the wavelength selection filter 2 between the contact surface 33 of the plug connector 3A and the contact surface 43 of the socket connector 4A by a resin 6 serving to keep this integrated state. In this case, while the filter end face 2a is in contact with the network input optical fiber 11 and network output optical fiber 14 which are located at the contact surface 33, the filter end face 2b is in contact with the node output optical fiber 12 and node input optical fiber 13 which are located at the contact surface 43.

The operation of the optical module 1A is substantially equivalent to the operation of the optical module 1 according to the first embodiment, and therefore no redundant explanation thereof will be repeated.

In accordance with the second embodiment as described above, since the filter 2, the plug connector 3A and the socket connector 4A can be easily integrated, it is possible to reduce the cost of manufacturing the optical module 1A. In addition, the handling of the optical module 1A becomes easy.

Figure 6:
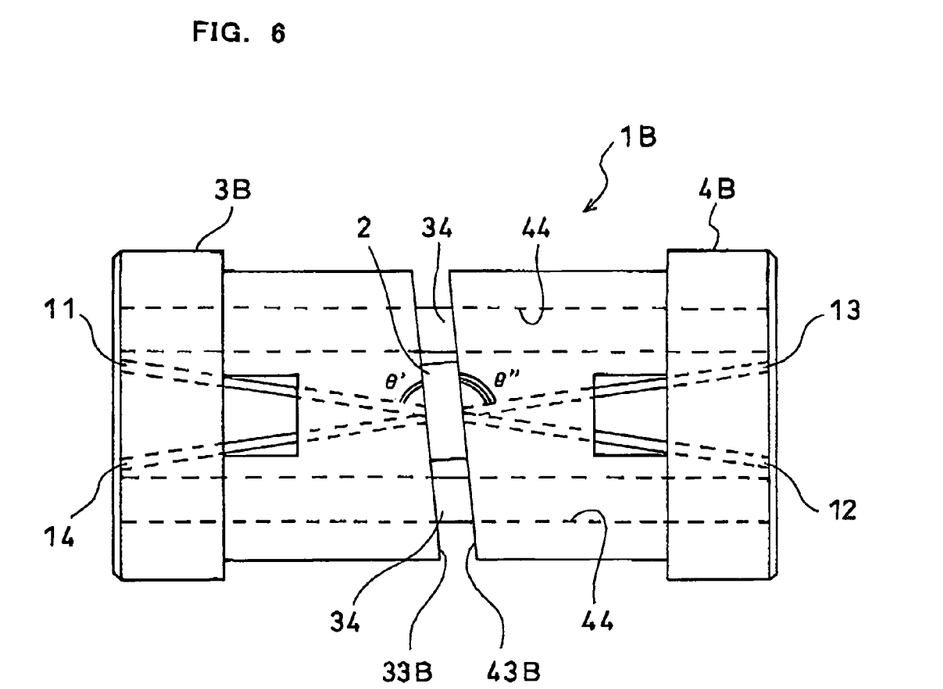
FIG. 6 is a cross sectional view showing an optical module in accordance with the third embodiment of the present invention.

In the following explanation, the third embodiment in accordance with the present invention will be explained with reference to FIG. 6. FIG. 6 is an external view showing the optical module according to the third embodiment. The optical module 1B according to the third embodiment is substantially the same as the optical module 1 except for the contact surface 33B of a plug connector 3B corresponding to the plug connector 3 of the optical module 1, and the contact surface 43B of a socket connector 4B corresponding to the socket connector 4 of the optical module 1, and therefore no redundant explanation thereof will be repeated, As shown in FIG. 6, at the contact surface 33B of the plug connector 3B, the network input optical fiber 11 comes in contact with the filter end face 2a of the wavelength selection filter 2 at an angle $\theta'$ of no greater than 90 degrees. On the other hand, at the contact surface 43B of the socket connector 4B, the network input optical fiber 13 comes in contact with the filter end face 2b of the wavelength selection filter 2 at an angle $\theta''$ of no greater than 90 degrees. These angles $\theta'$ and $\theta''$ are adjusted by surface polishing the contact surfaces 33B and 43B so that the contact surfaces 33B and 43B are inclined to be parallel with each other.

In accordance with the third embodiment as described above, the light waves input to the wavelength selection filter 2 from the network input optical fiber 11 and the node input optical fiber 13 are prevented from being reflected toward the respective optical fibers 11 and 13 by an easy work of surface polishing the contact surfaces 33B and 43B into inclined surfaces.

While illustrative embodiments of the invention have been described above, the present invention is not limited thereto, but it will be appreciated that various design changes may be made to the invention without departing from the scope defined in the appended claims. For example, while the contact surfaces 33 and 43 are surface polished in order to form rounded convex surfaces at whose center positions the ends of the node output optical fiber 11 and the node input optical fiber 14 are located respectively in the case of the first embodiment, the configuration is not limited thereto but the contact surfaces may be generally flat.

Also, while the wavelength selection filter 2 is replaceable in the case of the first embodiment, the configuration is not limited thereto, but the wavelength selection filter 2 may be fixed to at least one of the contact surfaces 33 of the plug connector 3 and the contact surfaces 43 of the socket connector 4 such that it is irreplaceable.

Furthermore, while the plug connector 3 and the socket connector 4 are designed in conformity with the MT connector standard in the case of the first embodiment, the configuration is not limited thereto, but any other standard or nonstandard specification may be applied.

In addition, while the plug connector 3 is provided with the plugs 34 and the socket connector 4 is provided with guides 44 corresponding thereto in the case of the first embodiment, the configuration is not limited thereto, but the plug connector may be provided with guides and the socket connector may be provided with plugs corresponding to thereto. Moreover, the number of the plugs and guides may be 1, 3 or more.

Furthermore, while the lock spring 50 is provided as a locking mechanism for maintaining the engagement between the plug connector 3 and the socket connector 4 in the case of the first embodiment, the plug connector and the socket connector may be designed to have engageable geometries as a locking mechanism for maintaining the engagement, or such a locking mechanism may be simply dispensed with.

In addition, while the plug connector 3 and the socket connector 4 are made of PPS or LCP in the case of the first embodiment, they may be made of another resin, a ceramic and any other appropriate material.

Furthermore, while the respective optical fibers 11 to 14 are fixedly positioned by the fiber insertion holes 31, 32, 41 and 42 in the case of the first embodiment, the configuration is not limited thereto, but the optical fibers may be fixedly positioned by designing at least part of the plug connector and the socket connector to be decomposable in order that an optical fiber can be disposed in a V-shaped groove formed on the decomposed part for fixedly positioning it.

In addition, the respective optical fibers 11 to 14 are designed to come in direct contact with the filter end faces 2a and 2b in the case of the first embodiment, the configuration is not limited thereto, but optical lenses or the like may be interposed between the respective optical fibers 11 to 14 and the filter end faces 2a and 2b. For example, in the case where optical lenses may be interposed in between, light waves can be collimated and focused to the output target. In this configuration, it is possible to effectively propagate light waves. Incidentally, these optical lenses may be bonded and fixed to either of the plug connector 3, the socket connector 4 and the wavelength selection filter 2.

Also, while the plug connector 3 and the socket connector 4 are fixed with a resin in the second preferred embodiment, the configuration is not limited thereto, but an adhesive or another material may be used for fixing.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An optical module comprising:
   a filter configured to transmit only a light-wave having a particular wavelength and reflect a light wave having other wavelengths;
   a first optical fiber configured to guide a first light wave to a first end face of said filter;
   a second optical fiber configured to guide the first light wave transmitted through said filter from a second end face of said filter opposite said first end face, if the first light wave has the particular wavelength;
   a third optical fiber configured to guide a second light wave having the particular wavelength to said second end face;
   a fourth optical fiber configured to guide, from said first end face, the first light wave not having the particular wavelength that is reflected by said filter and the second light wave transmitted through said filter;
   a first base configured to position said first and fourth optical fibers; and
   a second base configured to position said second and third optical fibers, wherein
   said filter can be supported between the end faces of said first and the second bases in order that the end faces of said first and fourth optical fibers come in contact with said first end face and that the end faces of said second and third optical fibers come in contact with said second end face.

2. The optical module as claimed in claim 1 wherein said first to fourth optical fibers are positioned in order that said first and third optical fibers make predetermined angles respectively with said first and second end faces and that the straight line connecting said first and second optical fibers intersects with the straight line connecting said third and fourth optical fibers in the inside of said filter.

3. The optical module as claimed in claim 1 wherein the end faces of said first base has a rounded convex surface at whose leading edge position the end faces of said first and fourth optical fibers are located, and the end face of said second base has a rounded convex surface at whose leading edge position the end faces of said second and third optical fibers are located.

4. The optical module as claimed in claim 1 wherein the end faces of said first and second bases are inclined in order that the contact directions of said first and third optical fibers to said first and second end faces make predetermined angles respectively with said first and second end faces of said filter.

5. The optical module as claimed in claim 1 wherein said filter is replaceable.

6. The optical module-as claimed in claim 1 wherein said first and second bases are provided with a connector mechanism for making it possible to engage and disengage with and from each other.

7. The optical module as claimed in claim 1 wherein said first and second bases are integrated in the condition that said filter is supported therebetween by a resin.

8. The optical module as claimed in claim 1 wherein one of said first and second bases is provided with a positioning plug for positioning said first and second bases in relation to each other when they support said filter therebetween, and wherein the other of said first and second bases is provided with a guide for guiding said positioning plug.

9. The optical module as claimed in claim 1 wherein said first and second bases are provided with a locking mechanism for locking said first and second bases with said filter being supported therebetween.

10. The optical module as claimed in claim 1 wherein said first and second bases are made of at least one of a ceramic and a resin.

* * * * *